United States Patent
Goula Barri

(10) Patent No.: US 12,222,019 B2
(45) Date of Patent: Feb. 11, 2025

(54) STEEL CABLE ADJUSTMENT TERMINAL AND METHOD FOR USING SAME

(71) Applicant: Eduard Goula Barri, Barcelona (ES)

(72) Inventor: Eduard Goula Barri, Barcelona (ES)

( * ) Notice: Subject to any disclaimer, the term of this patent is extended or adjusted under 35 U.S.C. 154(b) by 171 days.

(21) Appl. No.: 18/008,411

(22) PCT Filed: Apr. 29, 2021

(86) PCT No.: PCT/ES2021/070293
§ 371 (c)(1),
(2) Date: Dec. 5, 2022

(87) PCT Pub. No.: WO2021/245301
PCT Pub. Date: Dec. 9, 2021

(65) Prior Publication Data
US 2023/0228316 A1    Jul. 20, 2023

(30) Foreign Application Priority Data
Jun. 5, 2020 (ES) ................ ES202030538

(51) Int. Cl.
*F16G 11/04* (2006.01)
*F16G 11/06* (2006.01)
*F16G 11/10* (2006.01)

(52) U.S. Cl.
CPC ............ *F16G 11/046* (2013.01); *F16G 11/06* (2013.01); *F16G 11/103* (2013.01)

(58) Field of Classification Search
CPC ............ Y10T 24/3996; Y10T 24/3969; Y10T 24/3971; F16G 11/103; F16G 11/06; F16G 11/046
See application file for complete search history.

(56) References Cited

U.S. PATENT DOCUMENTS

| | | | |
|---|---|---|---|
| 671,074 A * | 4/1901 | White ................ | F16G 11/04 403/211 |
| 1,355,004 A * | 10/1920 | Sandford ............. | F16G 11/046 24/136 K |

(Continued)

FOREIGN PATENT DOCUMENTS

| | | |
|---|---|---|
| JP | 2001165245 A | 6/2001 |
| KR | 20190041269 A | 4/2019 |

OTHER PUBLICATIONS

Goula Barri, E., et al., PCT/ES2021/070293, International Search Report, Jul. 20, 2021, 9 pages.

(Continued)

*Primary Examiner* — Robert Sandy
*Assistant Examiner* — Michael S Lee
(74) *Attorney, Agent, or Firm* — John Alumit

(57) ABSTRACT

Steel wire rope adjuster terminal consisting of a piece of equipment designed to be assembled on a steel wire rope in order to form one of the two fastening ends thereof by means of a system for adjusting the length of the steel wire rope and then locking it, which is based on a fixed component comprising an internal box in which a cam can rotate until it forms a channel by means of respective grooves wherein the steel wire rope can slide if it is not bearing a load, and in which the cam is activated and trapped against the fixed component when the wire rope is bearing a load, so that the system does not damage the wire rope in any way and it can be unlocked in a completely reversible way.

2 Claims, 3 Drawing Sheets

(56) References Cited

U.S. PATENT DOCUMENTS

| | | | | |
|---|---|---|---|---|
| 1,644,375 | A | * | 10/1927 | Haworth ............... F16G 11/046 403/213 |
| 2,085,333 | A | * | 6/1937 | Reynolds ............. F16G 11/046 254/DIG. 15 |
| 2,130,040 | A | * | 9/1938 | Siler ........................ B66B 7/06 294/82.12 |
| 2,311,043 | A | * | 2/1943 | Furey ...................... F16G 11/06 403/127 |
| 2,608,731 | A | * | 9/1952 | Summers ............. F16G 11/046 24/132 R |
| 6,662,739 | B1 | * | 12/2003 | Radford ................ B60P 7/0823 114/218 |
| 2002/0154944 | A1 | | 10/2002 | Traktovenko et al. |
| 2018/0347665 | A1 | | 12/2018 | LeBeau |
| 2022/0340401 | A1 | * | 10/2022 | Lindberg ................. B66D 1/28 |

OTHER PUBLICATIONS

Goula Barri, E., et al., PCT/ES2021/070293, Written Opinion, Jul. 20, 2021, 18 pages.

* cited by examiner

STEEL CABLE ADJUSTMENT TERMINAL AND METHOD FOR USING SAME

OBJECT OF THE INVENTION

The main object of the present invention is to provide a piece of equipment comprising a reusable device designed to be assembled on a steel wire rope in order to form one of the two fastening ends thereof by means of a system for adjusting the length of the wire rope and locking said wire rope, so that it can be used as a rigging system without damaging the wire rope in any way, and so that it can be unlocked in a completely reversible way.

The scope of the present invention is within the industry that manufactures accessories for rigging systems, which are most commonly used for adapting venues to host shows, trade fairs and festivities, as well as for industrial applications in general.

BACKGROUND OF THE INVENTION

Regarding the background of the invention, it is common for every city and most towns in our country to set up stages for concerts, theatre plays or other events, which are especially frequent during the summer, when the weather is good and during the holidays. In this line of work, professionals specialised in "rigging" or installing loads overhead are in charge of assembling the components generally used in trade fairs and shows, and whose job is to attach wire ropes secured by two respective anchor points on each end. Even the exhibition and conventions centres in the biggest cities in Spain, such as Madrid, Barcelona, etc., have a series of technical specifications that detail the conditions that must be met by any element hanging overhead from the structure of any of its pavilions. Their aim is to ensure the safety of people and the facilities, both during the phase of assembly and disassembly as well as when the final structure is used during the celebration of an event.

Regarding the state of the art in relation to rigging systems, there are currently numerous systems in the market for fastening steel wire ropes to an anchor point, which are commonly known as wire rope terminals.

The terminals called "wedge socket" are manufactured using forged steel with a hot dip galvanized finish and they are available for wires ropes with a diameter ranging from 7 mm to 86 mm and a tensile strength ranging from 8 to 650 tons respectively. Although wedge sockets are very commonly used, it should be noted that they cause steel wire ropes to lose 20% of their tensile strength.

Another terminal used is "spelter sockets", which are manufactured in forged steel with a hot dip galvanized finish. There are different models depending on whether the sockets are open or closed, which are available for wire ropes with a diameter ranging from 6 mm to 115 mm and a tensile strength ranging from 8 to 1,200 tons respectively. Spelter sockets are assembled on steel wire ropes, or alternatively, they use a zinc alloy or a Wirelock-type resin. Using these terminals ensures the tensile strength of the steel wire rope has 100% efficiency.

Finally, the pear sockets and links by the Dutch manufacturer Nemag make it possible to splice wire ropes to then put them through pulleys, and they are widely used in stowage. Like the aforementioned spelter sockets, they are mounted on steel wire ropes, with a zinc alloy or a Wirelock-type resin, ensuring 100% efficiency of the tensile strength of the steel wire rope.

Additionally, the following inventions in the state of the art are identified by their publication number and title respectively:

ES2721261T3: clevis fastener assembling accessory for steel wire rope and end loops made of synthetic rope.

ES8308800A1: device for fastening and/or moving an elongated tensile element longitudinally, particularly a steel wire rope or a rod.

ES2627511R1: device for hanging and fastening loads on steel wire ropes.

ES2069171T3: emergency coupling of conveyor belts of steel wire ropes.

However, the solutions analysed in the state of the art do not have a physical configuration nor the functional characteristics that make it possible to fasten the wire rope while being able to adjust the length of said wire rope in a completely reversible way. That is, these solutions either do not make it possible to adjust the length of the wire rope, or else they are limited to adjusting the wire rope when it is first installed, without having the option to later rectify or adjust the length of the wire rope since it is bent or damaged after it is first installed.

By contrast, the "steel wire rope adjuster terminal" provides the state of the art with an accessory with a series of characteristics aimed at adjusting the anchoring point of the wire rope by means of an asymmetrical configuration of the assembly, which promotes the health of the wire rope by aligning the anchoring point along the same direction of the load, making it possible to both lock or fasten the wire rope as well as adjust said wire rope by lengthening or shortening the length thereof in a way that is easy, quick, safe and posing no limits to the number of times the wire rope can be used since it does not suffer any damages or deformations with each use.

EXPLANATION OF THE INVENTION

The "steel wire rope adjuster terminal" that is the object of the present invention has been designed to be installed on a steel wire rope commonly used in rigging systems, with the aim of forming an anchor point on one of the two fastening ends of the wire rope and comprising the following elements.

1. A main fixed metal enclosure with the thickness required to house the aforementioned wire rope inside it, comprising a bore in the upper lateral end thereof in order to secure it to a clevis placing it on the axis bearing the load, and comprising an internal channel designed in such a way that the aforementioned steel wire rope of a diameter between eight and ten millimetres can slide along said channel, so that a crown can be configured inside the enclosure when it is accessed from the open base thereof.

2. An internal cam with outer grooves designed to be able to rotate around an axis connecting it to the aforementioned enclosure in a small section determined by the respective ends trapped by the movement of the part of the cam protruding from the open base of the enclosure, affecting the maximum load of the assembly, so that the aforementioned steel wire rope of a diameter between eight and ten millimetres creates a crown configuration inside the cam as it is manually moved between both grooves accessed from the respective openings located on the base of the assembly, forming the axis bearing the load of the wire rope between the bore for fastening the wire rope to a clevis and the opening located on the same side of the assembly.

3. A lid for closing the assembly by means of the corresponding screws for securing the lid to the main fixed metal enclosure, which allows the internal body in the shape of a cam to rotate along the expected plane without posing any risk of entrapment to the users.

4. A complementary locking system comprising a captive screw inserted by means of an existing bore in the main fixed metal enclosure until it makes perpendicular contact with the wire rope proximate to where the wire rope comes out of the assembly on the side opposite to the load bearing side and on the plane of the cam, thus immobilising the wire rope against the cam itself.

Based on the components described above, once the wire rope has been inserted inside the channel formed by the respective grooved surfaces, it is possible to manually adjust the length of the steel wire rope before it is locked by using both hands to move the respective ends of the wire rope along the accesses of the assembly, on the plane of the cam and towards the interior of the assembly by making it possible to simultaneously slide the wire rope along the internal channel without activating the movement of the cam.

By contrast, when the steel wire rope is used to bear a load between the two anchoring ends thereof, the steel wire rope moves slightly inside the enclosure dragging the internal cam until it traps the wire rope against the enclosure itself, locking the movement of the wire rope.

The procedure described shows that the length of the steel wire rope can be easily modified by adjusting the locking point inside the device described when said device is not bearing any loads. Then, when it has to be used in a specific position, once the optimum length of wire rope has been adjusted, the assembly is locked when the load is fastened, thus preventing the wire rope from moving. Finally, at this point the aforementioned complementary locking system can be activated by inserting the corresponding captive screw immobilising the wire rope against the cam.

DESCRIPTION OF THE DRAWINGS

To complete the invention described and to give a better understanding of the characteristics of the invention, according to a preferred embodiment thereof, this description is accompanied by a set of drawings in which the figures described below have been represented, for purely illustrative purposes and should not be construed as limiting.

It is worth highlighting the following constituent elements featured in the aforementioned drawings:

1. Main fixed metal enclosure
2. Internal cam with outer grooves
3. Lid
4. Screws for securing the lid to the main fixed metal enclosure
5. Pin for securing the lid to the main fixed metal enclosure and the axis of rotation of the cam
6. Captive screw of the complementary locking system

EXEMPLARY PREFERRED EMBODIMENT

Figure 1:
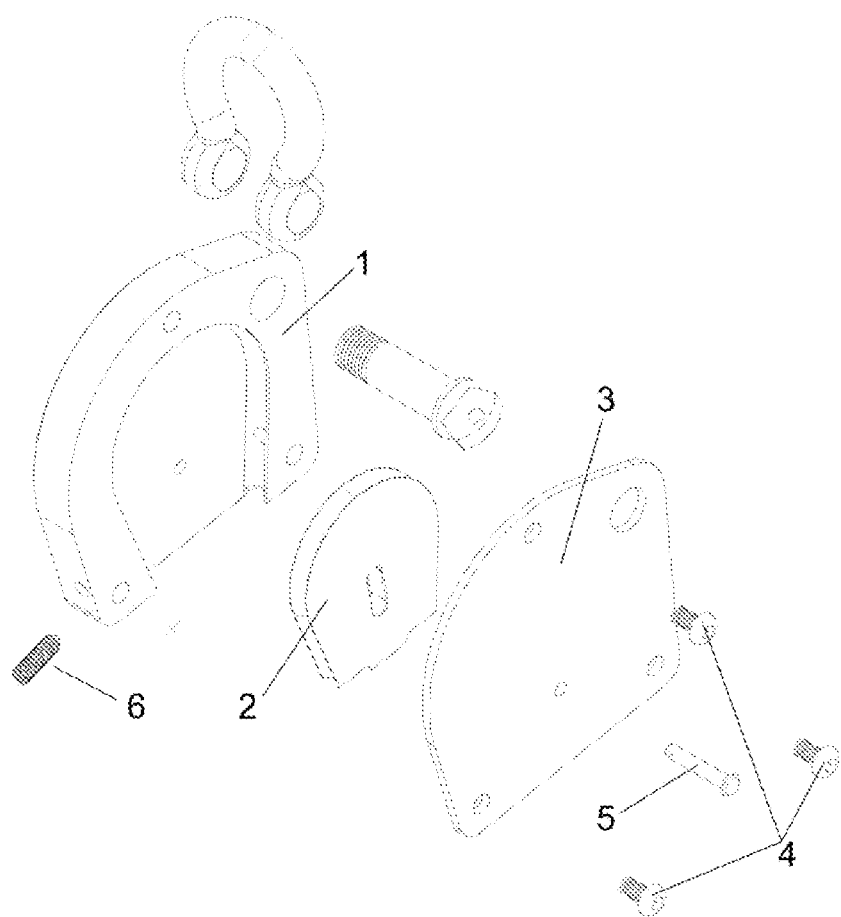
FIG. 1. Main exploded perspective view of the "Steel wire rope adjuster terminal".
Figure 2:
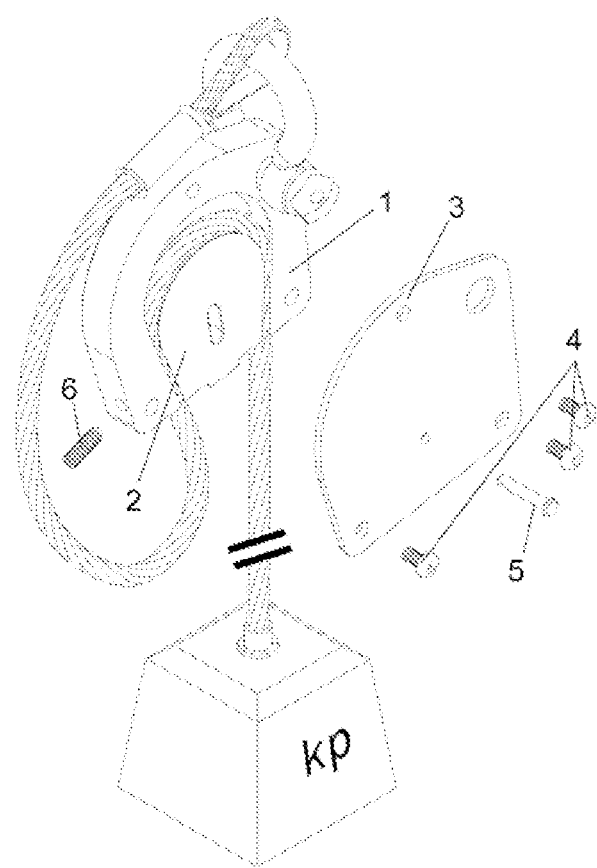
FIG. 2. Main perspective view of the "Steel wire rope adjuster terminal" once the steel wire rope has been placed inside it.
Figure 3:
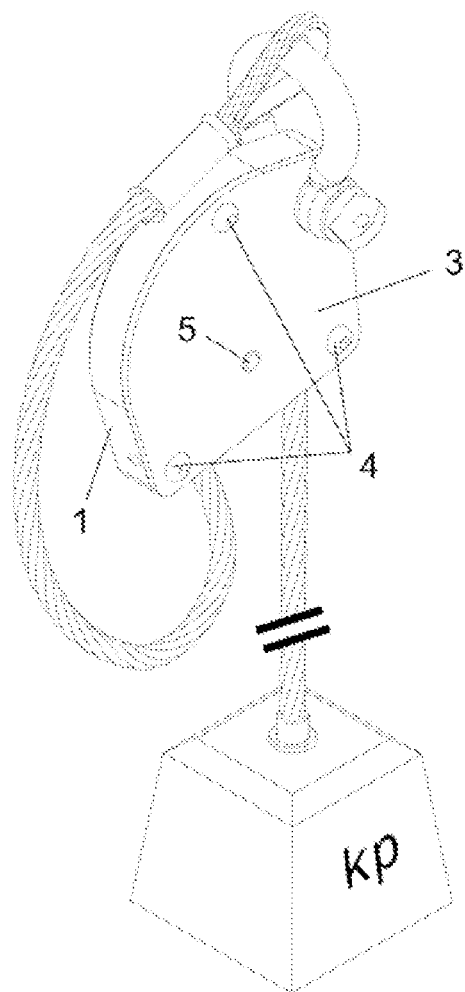
FIG. 3. Main perspective view of the "Steel wire rope adjuster terminal" bearing a load.

In an example of a preferred embodiment, the "Steel wire rope adjuster terminal" can be designed as shown in FIGS. 1-3, comprising a main fixed metal enclosure (1) designed to house the internal cam with outer grooves inside it (2), and which is provided with a lid (3) once it has been assembled.

Both the main fixed metal enclosure (1) as well as the aforementioned lid (3) contain respective bores that coincide when the assembly is closed and which house three screws (4), with the bores being threaded on the aforementioned main fixed metal enclosure (1), and an additional larger bore that also coincides when the assembly is closed, which is designed to house the bolt of a clevis of the type commonly used in rigging systems.

Finally, in order to close the assembly ensuring that the internal cam with outer grooves (2) can move inside the main fixed metal enclosure (1), the lid (3) is secured on the aforementioned elements when the corresponding pin for fastening the lid to the fixed enclosure and the axis of rotation of the cam (5) is inserted in the corresponding bores after they have been aligned.

In order to complete the description it is necessary to highlight that as seen in FIG. 2, the internal box of the main fixed metal enclosure (1) is designed to house the internal cam with outer grooves (2) that is provided with a small range of rotation limited by the contact made by the part protruding from the enclosure on the open base thereof, which in combination with the internal channel of the main fixed metal enclosure (1) itself, forms a channel where the steel wire rope is housed in order to be able to slide inside the assembly in two ways:

1. Sliding the wire rope along the internal channel without dragging the cam by making use of both hands to move the respective ends of the wire rope along the accesses of the assembly, on the plane of the cam and towards the interior of the assembly, making it possible to simultaneously move the wire rope along the internal channel in order to adjust the length of a wire rope that is not bearing a load.

2. Sliding the cable along the internal channel and dragging the cam (2) up to the point the assembly is locked when the wire rope that is bearing a load drags the internal cam with outer grooves (2) inside the main fixed metal enclosure (1) until the cam meets the enclosure (1) on the open base thereof, trapping the steel wire rope.

Finally, it is worth noting that the range of rotation of the cam (2) inside the main fixed metal enclosure (1) limits the maximum load it can hold safely since it limits the movement of the cable.

Regarding the procedure to operate the device, the assembly can be done by inserting the steel wire rope inside the main fixed metal enclosure (1), followed by inserting the cam (2) with the protruding side thereof facing the base of the enclosure and keeping the steel wire rope in the channel formed by assembling both pieces; finally, the lid (3) is closed in order to complete the assembly and the corresponding screws (4 and 5) can be manually fastened so long as the steel wire rope is not bearing any loads.

Then, after the placement of the device and the length of the wire rope has been chosen, when the load is lifted a small rotation will trap the wire rope on the main fixed metal enclosure (1), generating a friction that will prevent the wire rope from sliding inside the assembly.

Finally, once the wire rope is bearing a load, it is possible to activate the complementary locking system by inserting the captive screw of the complementary locking system (6), which would be located on the surface near the opening opposite to the side bearing the load after it has been fastened using an Allen key.

It is not necessary to extend this description any further in order for any expert in the field to understand the scope of the invention and the advantages it provides for various applications, the materials used, the shapes of the different elements described and their relative positions, as well as the type of screws used and their dimensions, which may vary so long as said change does not alter the essence of the invention. The terms detailed in the description should be understood in a broad sense and should not be construed as limiting.

The invention claimed is:

1. A steel wire rope adjuster terminal comprising:
   a main fixed enclosure configured to house within the enclosure, an internal cam with outer grooves along with space to form a channel between the internal cam and main fixed enclosure to allow a steel wire rope to be inserted therein and for the cam to move with the steel wire rope;
   a lid shaped to cover an entire exposed side of the main fixed enclosure, an entire exposed side of the internal cam, and a steel wire rope inserted in the channel therebetween;
   a plurality of bores on the main fixed enclosure and on the lid that coincide when the lid covers the main fixed enclosure and the internal cam; said plurality of bores housing a plurality of screws; and said plurality of bores on the main fixed enclosure being threaded;
   a main bore that is larger than the plurality of bores on both the main fixed enclosure and the lid, which also coincide; said bore being configured to house a bolt of a clevis commonly used in rigging systems;
   a pin for securing the lid to the main fixed enclosure and through an axis of rotation of the internal cam; and
   a captive screw functioning as a complementary locking system, disposed in a bore of the main fixed enclosure, said bore located on an outside surface of the fixed enclosure that is adjacent to an exit of the channel between the internal cam and the main fixed enclosure on a side of the main fixed enclosure that does not bear a load,
   wherein when a load is lifted on the steel wire rope inserted between the internal cam with outer grooves and the main fixed enclosure, a small rotation from the lift traps the steel wire rope on the main fixed enclosure and insertion of the captive screw locks the steel wire rope in place.

2. A method for using the steel wire rope adjuster terminal of claim 1, comprising the steps of:
   (a) inserting a steel wire rope inside the main fixed enclosure;
   (b) inserting the internal cam into the main fixed enclosure, with a protruding side of the internal cam facing a base of the main fixed enclosure, while keeping the steel wire rope in the channel between the internal cam and the main fixed enclosure;
   (c) placing the lid over the main fixed enclosure and internal cam and fastening the lid with the plurality of screws;
   (d) lifting a load attached to the steel wire rope; and
   (e) inserting the captive screw into the main fixed enclosure to lock the steel wire rope in place.

* * * * *